United States Patent

[11] 3,552,446

[72] Inventors Aime Barroil
Moirans;
Andre Teytu, Grenoble, France
[21] Appl. No. 835,571
[22] Filed June 23, 1969
[45] Patented Jan. 5, 1971
[73] Assignee Commissariat A L'Energie Atomique
Paris, France
[32] Priority July 11, 1968
[33] France
[31] No. 158,753

[54] DEVICE FOR EQUALIZING DIFFERENTIAL EXPANSIONS IN A U-SHAPED PIPE
3 Claims, 1 Drawing Fig.
[52] U.S. Cl. .................................................... 138/178
[51] Int. Cl. .................................................... F16l 3/18
[50] Field of Search ........................................ 138/26, 30, 31, 121, 173, 177, 178; 285/228

[56] References Cited
UNITED STATES PATENTS
2,314,776 3/1943 Dittus et al. .................. 285/228
3,082,795 3/1963 Heller ............................ 138/173X

*Primary Examiner*—Laverne D. Geiger
*Assistant Examiner*—Richard J. Sher
*Attorney*—Cameron, Kerkam and Sutton ABSTRACT: The device comprises two bellows elements placed respectively in each of the two arms of a U-shaped pipe and a unit providing a connection between the arms. The unit comprises a tie rod which is rigidly fixed at one end to the central portion of the U and which is substantially parallel to the two pipe arms. The tie rod is pivotally attached to the center of a transverse link rod which couples the two pipe arms and is provided at the end remote from the central portion of the U with axial guide means which are adapted to cooperate with a second transverse link rod. The ends of the two link rods are pivotally attached to the two arms of the pipe.

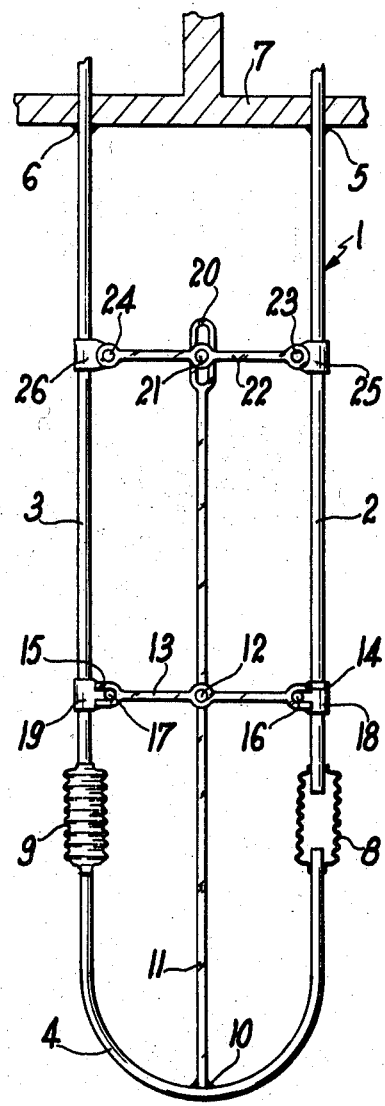

DEVICE FOR EQUALIZING DIFFERENTIAL EXPANSIONS IN A U-SHAPED PIPE

The present invention relates to a device for equalizing differential expansions, said device being primarily intended to be mounted between the two arms of a U-shaped pipe through which a hot fluid under pressure is circulated.

It is in fact known that, when a pipe which has the shape of a U or open loop is anchored at both ends in an indeformable structural mass, thermal stresses are liable to develop in the central portion of the U, especially when said pipe carries a fluid under pressure whose temperature varies between two distant points of the loop. The stresses which arise either from a temperature difference between the two arms of the U or from a difference in expansion coefficients of the materials constituting each arm accordingly result in general deformation of the loop.

This invention is directed to an equalizing device which overcomes the above-mentioned disadvantages by permitting of free differential expansion of the two arms of the pipe and consequently by preventing the deformation of this latter.

To this end, the equalizing device under consideration is characterized in that it comprises two bellows elements placed respectively on each of the two arms of the pipe and a unit providing a connection between said arms comprising a tie rod which is rigidly fixed at one end to the central portion of the U formed by said pipe and which is disposed in substantially parallel relation to the two arms, said tie rod being pivotally attached to the center of a transverse link rod which couples said two pipe arms and being provided at the end remote from the central portion of the U with axial guide means which are adapted to cooperate with a second transverse link rod, the ends of the link rods being pivotally attached to the two arms of the pipe.

Preferably, the guide means are constituted by a slot which is provided at the end of the tie rod and in which is engaged a stud carried by the second link rod.

The complementary description which follows below is given by way of indication without any limitation being implied and relates to one form of construction of an equalizing device according to the invention as illustrated in the accompanying drawings, in which the single figure is a diagrammatic view in elevation.

There is shown in this figure a duct or pipe 1 having the general shape of a U, the arms 2 and 3 of which are parallel to each other and joined by a central portion 4. At the ends remote from the central portion 4, said pipe arms 2 and 3 are anchored at 5 and 6 to a rigid wall or structural mass 7.

According to the invention, the pipe 1 as thus constituted is associated with an equalizing device which is capable of compensating for differential expansions. Said device is essentially composed of two bellows elements 8 and 9 which are respectively mounted on the arms 2 and 3 of the pipe and constitute a partial interruption or break in said pipe as shown in particular in the sectional view of the bellows element 8. The ends of said bellows are secured to the pipe sections and provide a connection between these latter in such a manner as to ensure continuity of leak tightness with respect to any fluid under pressure which circulates through said pipe. There is fixed at 10 on the central portion 4 either by welding or by means of any other suitable coupling device a tie rod 11 which extends substantially parallel to the pipe arms 2 and 3. A first transverse link rod 13 is pivoted to said tie rod 11 about a pin 12 and the ends 14 and 15 of said link rod have the shape of two forks engaged over studs 16 and 17 carried by two collars 18 and 19 which are rigidly fixed respectively to the arms 2 and 3 of the pipe 1. In addition, the tie rod 11 is provided at the end remote from the central portion 4 of the pipe with a guide slot 20 in which is mounted a stud 21 carried by a second transverse link rod 22. The link rod last mentioned is pivotally coupled at 23 and 24 to two additional collars 25 and 26 which are also rigidly fixed to the pipe arms 2 and 3.

The operation of the equalizing device which is thus constructed can readily be explained if consideration is given to the manner in which the pipe 1 behaves when any fluid is circulated through said pipe and subjected along its flow path to a temperature variation which is liable to give rise to thermal stresses. Accordingly, consideration should first be given to the case in which, instead of the assembly hereinabove described, the pipe 1 were provided with only one expansion bellows element placed on either of the two pipe arms. In this wholly conventional case, the static pressure which prevails within the pipe necessarily exerts a thrust on the pipe extremities, thereby producing bending stresses in the pipe arm which is not fitted with a bellows element.

On the other hand, when use is made of the device hereinabove described, it is immediately apparent that, if the pipe arm 2 expands with respect to the arm 3 so that the collar 18, for example, is displaced by any given value $a$ with respect to the collar 19, the pivot pin 12 accordingly moves over a distance $a/2$ and the central portion 4 of the pipe is consequently displaced to the same extent by means of the tie rod 11. The bellows element 8 which is located on the arm 2 is accordingly compressed to an extent equivalent to the value $a/2$ whilst the bellows element 9 is extended at the same time over a distance which is also equivalent to $a/2$.

The result thereby achieved is that the bending stresses which act on the pipe arms and arise from differential expansion or from thrust are wholly eliminated. The pipe sections on each side of the bellows elements are perfectly maintained in position, thereby preventing said bellows from being subjected to either torsional or bending stresses as a result of any misalignment which could otherwise occur. Finally, movements of extension are distributed between the two bellows elements, each element being subjected to only one-half of the full range of motion which is produced by total expansion stresses.

By way of indication, it can be noted that an equalizing device of the type referred to is advantageously applied to a fluid duct which operates as a thermosiphon having two parallel arms, one arm being fitted with a heat source at the lower end whilst the other arm is fitted with a cold source at the upper end, a suitable temperature difference for the circulation of the fluid being continuously maintained by the two sources.

It is clearly understood that the invention is not limited in any sense either to the example of construction or to the field of application which have been more especially contemplated in the foregoing but extends to all alternative forms. In particular, provision could be made for mounting the device on heat exchangers comprising hairpin tubes and more generally in all cases in which differential expansions occur between parallel piping systems.

We claim:

1. A differential expansion equalizing device for a pipe through which a hot fluid under pressure is circulated, said pipe having two parallel arms and a U-shaped central portion, characterized in that said device comprises two bellows elements placed respectively on each of the two arms of said pipe and a unit providing a connection between said arms comprising a tie rod which is rigidly fixed at one end to the central portion of the U formed by said pipe and which is disposed in substantially parallel relation to the two arms, said tie rod being pivotally attached to the center of a transverse link rod which couples said two pipe arms and being provided at the end remote from the central portion of the U with axial guide means which are adapted to cooperate with a second transverse link rod, the ends of the two link rods being pivotally attached to the two arms of the pipe.

2. An equalizing device in accordance with claim 1, characterized in that the guide means are constituted by a slot which is provided at the end of the tie rod and in which is engaged a stud carried by the second link rod.

3. An equalizing device in accordance with claim 1, characterized in that said device is mounted in a fluid circulation pipe which operates as a thermosiphon.